No. 864,226. PATENTED AUG. 27, 1907.
J. W. BLODGETT.
METHOD OF INSERTING PLUGS IN PNEUMATIC TIRES.
APPLICATION FILED OCT. 3, 1904. RENEWED JAN. 11, 1907.
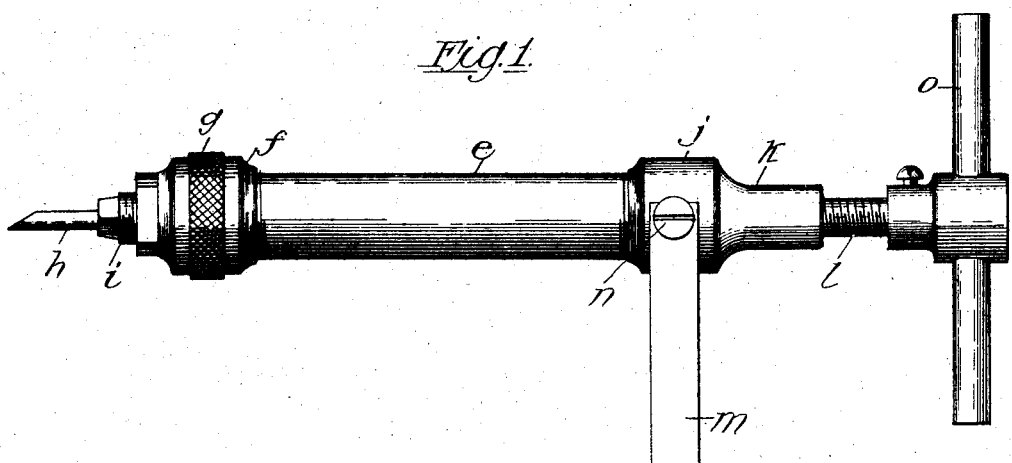
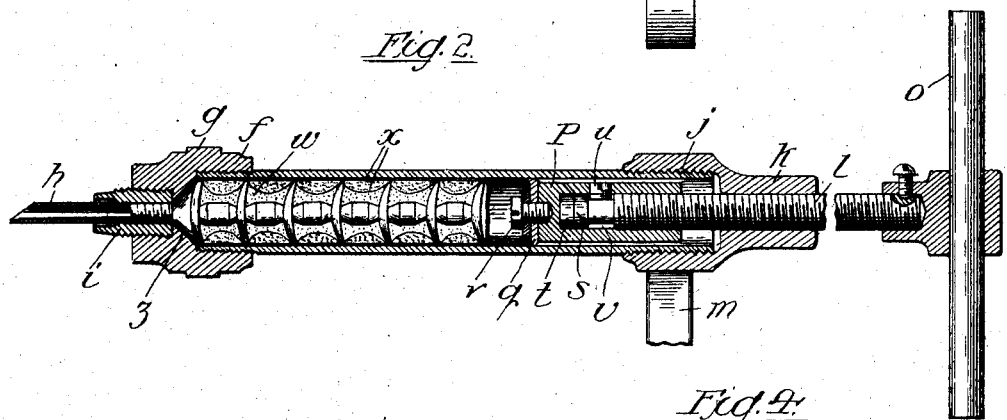
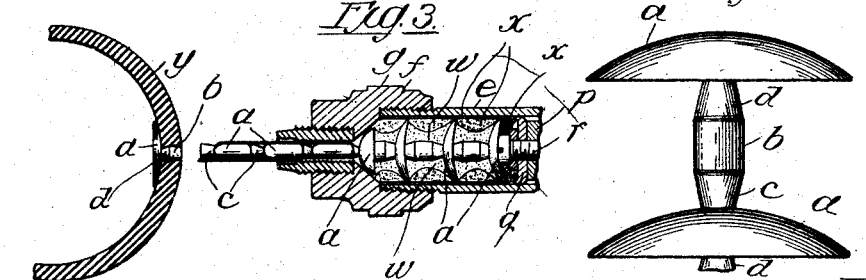
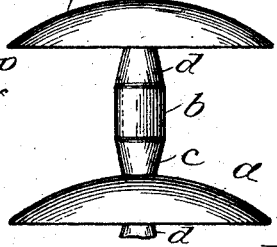
Witnesses:
Inventor:
John W. Blodgett
by John Howard McElroy
his Atty.

UNITED STATES PATENT OFFICE.

JOHN W. BLODGETT, OF CHICAGO, ILLINOIS, ASSIGNOR TO JOHN HOWARD McELROY, TRUSTEE, OF CHICAGO, ILLINOIS.

METHOD OF INSERTING PLUGS IN PNEUMATIC TIRES.

No. 864,226.  Specification of Letters Patent.  Patented Aug. 27, 1907.

Application filed October 3, 1904. Serial No. 226,929. Renewed January 11, 1907. Serial No. 351,900.

*To all whom it may concern:*

Be it known that I, JOHN W. BLODGETT, a citizen of the United States, residing at Chicago, in the county of Cook and State of Illinois, have invented certain new and useful Improvements in Methods of Inserting Plugs in Pneumatic Tires, of which the following is a specification.

My invention relates to the mending of punctures in pneumatic rubber tires, and is especially concerned with a novel method of inserting a plug in the tire at the point of puncture by which it can be inserted much more expeditiously and certainly, and with less damage to the tire.

As tires have hitherto been mended with plugs, it has been the practice to take a single plug in a pair of long-nosed pliers, or some similar instrument, and to force the plug and the ends of the pliers through the tire at the point of puncture. This method necessitates forming a very much larger hole than was apt to be made by the original puncture, so that while the puncture was mended, the tire was materially weakened at that point. By my improved method, I place the plugs, preferably in the form of a string of connected plugs, in a mending implement, for instance such as is shown in my application No. 225,715, filed September 23, 1904, and first force the nozzle of the loaded implement through the aperture, and then by operating the implement, the plug is forced, in a very contracted state, through the nozzle, which is smaller in diameter than the plug itself, so that the size of the puncture is not materially increased, and the tire is not thereby weakened.

The foregoing statement describes generally the method involved in carrying out my invention, but to illustrate the plug and the method in detail, as will be fully hereinafter described, I annex hereto a sheet of drawings, in which the same reference characters are used to designate identical parts in all the figures, of which,—

Figure 1 is a side elevation of the mending implement which I employ, and which is substantially the same as that disclosed in my above-mentioned application; Fig. 2 is a longitudinal section through the same, showing it loaded with a string of plugs and ready for use; Fig. 3 is a similar sectional view through the nozzle end of the implement and an adjacent tire in which a plug has just been inserted, the view showing somewhat more clearly the method of operation; and Fig. 4 is a detached view, on an enlarged scale, of a couple of the plugs.

The plugs which I employ are composed of the disk $a$, which is preferably crescent shaped in cross section, and the stem $b$, which forms the body of the plug, the disk $a$ serving to cover the interior of the tire immediately around the plug, and being covered with a viscous mending material, thoroughly prevents any air escaping through the puncture. For using them in my improved method, I prefer to form them in a string, the stem of one plug being attached to the disk of the adjacent plug, preferably by a reduced portion $c$. The plug between the body portion $b$ and the associated disk $a$ is also preferably cone-shaped, as shown at $d$, so that the shape of the parts tends to draw the disk firmly against the inner surface of the tire and to force the body of the plug outwardly from the tire. This plug may be made of solid rubber, but I preferably make it of a light, spongy rubber, as that can be more easily compressed in passing through the implement.

The implement which I employ consists of a cylindrical barrel $e$, the outer end of which is closed by the interiorly-threaded cap $f$ screwed thereon, which is preferably provided with the milled periphery $g$ to facilitate its removal for charging the implement. This cap carries a nozzle $h$, which is preferably composed of a tube screwed into the holder $i$, which in turn is screwed into the cap $f$, as shown. The nozzle proper is made of a small tube, and is preferably pointed to render it easily inserted, by cutting it off diagonally, as shown, and may be any size to correspond to the size of the plug to be used. The nut or holder $i$ is preferably squared or flattened at one end, as shown, in order to apply a wrench thereto conveniently. The other end of the cylinder $e$ is closed by the cap $j$, which is preferably interiorly threaded so as to be screwed onto the end of the cylinder $e$, and has the preferably reduced extension $k$, which is also interiorly screw-threaded to coöperate with the screw-threaded piston rod $l$. I preferably provide the implement with the handle $m$ to hold it from turning, if desired, while the piston is being screwed in, and this is conveniently formed of the yoke-shaped piece shown, which is held in place when the cap $j$ is screwed on by means of a pair of screws $n$, one of which is shown in Fig. 1, and which may be screwed into the cap $j$, and, if desired, into the cylinder $a$. The piston rod $l$ is forced inward to discharge the load by turning the handle bar $o$.

Owing to the viscidity of the paste with which I surround the plugs when placing them in the implement, it is inadvisable to attempt to turn the piston $p$ with its rod, so that I construct it of the cup having the leather or similar packing disk $q$ secured on its end by the screw $r$, and containing the smooth bearing surface $s$, which is preferably formed on a separate, hardened metallic disk $t$ placed in the bottom of the cup $p$, and against which the smooth end of the piston rod $l$ rotates as the plugs are forced out. To withdraw the piston for recharging, a short threaded pin $u$ is screwed through the cup $p$ and into the annular groove $v$, which is wider than the diameter of the pin $u$, and formed near the end of the piston rod $l$.

When the implement is to be charged, the piston rod $l$ is screwed back, and the cap $g$ is removed, and a string of plugs $b$ of the proper length is cut off, and they are rolled in some viscous material $w$, so as to be thoroughly coated thereby, and the string of plugs coated with the viscous material is then rolled up in a layer $x$, of thin tin foil or some other equivalent material, which will enable the sticky plugs to be handled. The charge is then inserted in the implement and the end of the tin foil that contains the material should be cut off and the cap $g$ replaced.

The tire $y$ being preferably inflated as much as the puncture will permit, the nozzle $h$ is forced into the puncture until its point projects through the tire, and the handle $o$ is then turned to screw the piston in. The interior of the cap $g$ leading to the nozzle $h$ is preferably inversely cone-shaped, as shown at $z$, so that the disk $a$ of the plug is properly folded back on the body thereof as it is forced into the tube of the nozzle, and the heavy pressure I am enabled by the implement to apply forces the plug in a very contracted state through the nozzle, as indicated in Fig. 3. When the disk $a$ has escaped from the nozzle $h$, the reduced resistance to the operation of the piston discloses the fact, and the further pushing in of the piston ceases, and it is slowly pulled back, at the same time rotating it, so that the surface of the disk $a$ next to the tire will be thoroughly rubbed around the puncture and the sticky material thoroughly distributed around the puncture so that the pressure of the air will force the disk against the puncture so thoroughly that there is no possibility of any air escaping. The drawing out of the implement is continued until its nozzle is sufficiently free of the tire to permit the plug being cut off, and when the plug has then been trimmed down flush with the face of the tire, the mending is completed, and the tire can be inflated as strongly as desired without any possibility of its leaking or blowing the plug out.

While I have herein shown and described my novel plug, I do not herein claim the same, but reserve the subject matter thereof for a divisional application.

While I have shown and described my invention as embodied in the form which I at present consider best adapted to carry out its purposes, and as used in the method at present considered by me to be the best, it will be understood that it is capable of some modifications and that I do not desire to be limited in the interpretation of the following claims except as may be necessitated by the state of the prior art.

What I claim as new, and desire to secure by Letters Patent of the United States, is,—

1. The method of inserting mending plugs consisting of a disk and stem, into punctures in pneumatic tires, etc., which consists of placing the plug, covered with a viscous material and wrapped in foil, in an injecting implement provided with a nozzle; in inserting the nozzle into the puncture; in forcing a plug surrounded by the viscous material through the nozzle of the implement, and in drawing the disk against the interior of the tire before releasing the plug from the implement.

2. The method of inserting mending plugs consisting of a disk and stem, into punctures in pneumatic tires, etc., which consists of placing the plug, covered with a viscous material and wrapped in foil, in an injecting implement provided with a nozzle; in inserting the nozzle into the puncture; in forcing a plug surrounded by the viscous material through the nozzle of the implement, and in withdrawing the disk and at the same time rotating it against the interior of the tire before releasing the plug from the implement.

3. The method of inserting mending plugs consisting of a disk and stem, into punctures in pneumatic tires, etc., which consists of placing a string of connected plugs, covered with a viscous material and wrapped in foil, in an injecting implement provided with a nozzle; in inserting the nozzle into the puncture; in forcing a plug surrounded by the viscous material through the nozzle of the implement; in drawing the disk against the interior of the tire and at the same time withdrawing the nozzle; and in then cutting off the plug.

4. The method of inserting mending plugs consisting of a disk and stem, into punctures in pneumatic tires, etc., which consists of placing a string of connected plugs, covered with a viscous material and wrapped in foil, in an injecting implement provided with a nozzle; in inserting the nozzle into the puncture; in forcing a plug surrounded by the viscous material through the nozzle of the implement; in drawing the disk and at the same time rotating it against the interior of the tire by withdrawing and rotating the nozzle of the implement; and in finally cutting off the plug.

In witness whereof, I have hereunto set my hand this 29th day of September, 1904.

JOHN W. BLODGETT.

Witnesses:
JOHN H. McELROY,
JULIA M. BRISTOL.